(12) United States Patent
Sakurai

(10) Patent No.: US 7,723,890 B2
(45) Date of Patent: May 25, 2010

(54) ELECTRIC MOTORS

(75) Inventor: Naoto Sakurai, Anjo (JP)

(73) Assignee: Makita Corporation, Anjo-Shi (JP)

( * ) Notice: Subject to any disclaimer, the term of this patent is extended or adjusted under 35 U.S.C. 154(b) by 164 days.

(21) Appl. No.: 12/219,288

(22) Filed: Jul. 18, 2008

(65) Prior Publication Data

US 2009/0026871 A1    Jan. 29, 2009

(30) Foreign Application Priority Data

Jul. 24, 2007  (JP) .................... 2007-191738

(51) Int. Cl.
    *H02K 1/00*      (2006.01)
(52) U.S. Cl. ................. 310/195; 310/234; 310/198
(58) Field of Classification Search ................. 310/195, 310/198, 224, 234, 204, 236
    See application file for complete search history.

(56) References Cited

U.S. PATENT DOCUMENTS 5,172,870 A * 12/1992 Van Assema ................ 310/198
5,994,812 A * 11/1999 Muszynski .................. 310/180
6,218,755 B1 * 4/2001 Tanaka et al. ............... 310/204
6,844,649 B2 * 1/2005 Tanaka et al. ............... 310/195
7,155,811 B2 * 1/2007 Wang .......................... 29/605
7,557,484 B2 * 7/2009 Kawashima et al. ........ 310/225
7,560,848 B2 * 7/2009 Roos et al. .................. 310/234

FOREIGN PATENT DOCUMENTS

JP    A-10-210704    8/1998

* cited by examiner

*Primary Examiner*—Thanh Lam
(74) *Attorney, Agent, or Firm*—Oliff & Berridge, PLC

(57) ABSTRACT

An electric motor includes an armature core, a commutator including a plurality of commutator segments, a neck disposed between the armature core and the commutator, and a plurality of wires each connected between two adjacent commutator segments and wound around the armature core via the neck. The wires include a first wire connected between first two adjacent commutator segments and a second wire connected between second two adjacent commutator segments positioned opposite to the first two adjacent commutator segments with respect to the axis of the armature core. The first wire and the second wire extend along the neck such that they do not contact with each other.

10 Claims, 10 Drawing Sheets

ELECTRIC MOTORS

This application claims priority to Japanese patent application serial number 2007-191738, the contents of which are incorporated herein by reference.

BACKGROUND OF THE INVENTION

1. Field of the Invention

The present invention relates to electric motors having an armature core with electric wires wound therearound, a commutator and a neck positioned between the armature core and the commutator.

2. Description of the Related Art

In general, as schematically shown in FIG. 2(B), a rotor R of an electric motor M includes an armature core 10 with wires W wound therearound, a commutator 12 connected to the wires W, and a neck 14 positioned between the armature core 10 and the commutator 12. In order to prevent the wires W from floating up in the region of the neck 14 after the winding operation of the wires W, Japanese Laid Open Patent Publication No. 10-210704 has proposed the following process.

Thus, as shown in FIG. 10(A), in the case of a wire W1 that has one end connected to a commutator segment No. 1 of the commutator 12, the wire W1 is wound around the neck 14 by about one turn, passed through one of armature slots 11 (armature slot No. 1) formed in the outer circumferential surface of the armature core 10, and is then passed through a armature slot No. 8 that is positioned on the side opposite to the armature slot No. 1 with respect to the center of the armature core 10. Thereafter, the wire W1 is wound around the armature core JO through the armature slot No. 1 and the armature slot No. 8. After the wire W1 has wound around the armature core 10, the other end of the wire W1 leaves from the armature slot No. 8, wound around the neck 14 by a half turn, and is thereafter connected to a commutator segment No. 2 that is positioned next to the commutator segment No. 1.

The opposite ends of the wire W1 are loosely wound around the neck 14. Therefore, it is possible to prevent the wire W1 from floating in a region of the neck 14 after the winding operation of the wire W1 has been completed. In other words, the portions of the wire W1 extending between the armature core 10 and the commutator 12 do not need to be tensioned. Hence, no excessive load may be applied to the wire W1 due to excessive tension applied during the winding operation or due to vibrations that may be applied to the wire W1 during the operation of the motor. Therefore, it is possible to prevent potential breakage of the wire W1 at a position proximal to the commutator 12. In FIG. 10(A), the rotor R has sixteen armature slots and thirty two commutator segments.

FIG. 10(A) also shows a wire W2 indicated by dotted lines. The wire W2 is connected between a commutator segment No. 17 and a commutator segment No. 18 that are offset by an angle of 180° from the commutator segment No. 1 and the commutator segment No. 2, respectively. The wire W2 is wound around the armature core 10 through a armature slot No. 16 and a armature slot No. 9 in a manner similar to the wire W1. Similarly, the other wires (not shown) also are wound around the armature core 10 through the armature slots determined based on the positions of the commutator segments to which the wires are connected.

As noted above, in the above publication, the wires W1 and W2 connected to the corresponding commutator segments are wound around the armature core 10 after they have been wound about the neck 14 by about one turn. Therefore, the wires W1 and W2 may contact each other in the region of the neck 14, because the wires W1 and W2 are connected to the commutator segment No. 1 and the commutator segment No. 17, respectively, which are offset by an angle of 180° relative to each other.

As shown in FIG. 10(B), brushes Br are connected between the commutator segments No. 1 and No. 2 and between the commutator segments No. 17 and No. 18. Therefore, a voltage that is equal to a power source voltage can be applied between the wire W1 and the wire W2. Further, portions of the wires W1 and W2 positioned in the region of the neck 14 are not so firmly fixed in position in comparison with their portions positioned in the region of the armature slots 11. Therefore, there may be a possibility that the wires W1 and W2 are rub each other due to vibrations during the operation of the motor M. This may cause reduction in thickness of insulation layers of the wires W1 and W2. In particular, in the case of the wires W1 and W2, there is a possibility of causing short-circuiting, because the potential difference between the wires W1 and W2 is large.

Therefore, there is a need in the art for motors that can prevent or reduce potential short-circuiting of wires at a region of a neck.

SUMMARY OF THE INVENTION

One aspect according to the present invention includes electric motors including an armature core, a commutator including a plurality of commutator segments, a neck disposed between the armature core and the commutator, and a plurality of wires each connected between two adjacent commutator segments and wound around the armature core via the neck. The wires include a first wire connected between first two adjacent commutator segments and a second wire connected between second two adjacent commutator segments positioned opposite to the first two adjacent commutator segments with respect to the axis of the armature core. The first wire and the second wire extend along the neck such that they do not contact with each other.

DETAILED DESCRIPTION OF THE INVENTION

Figure 1:
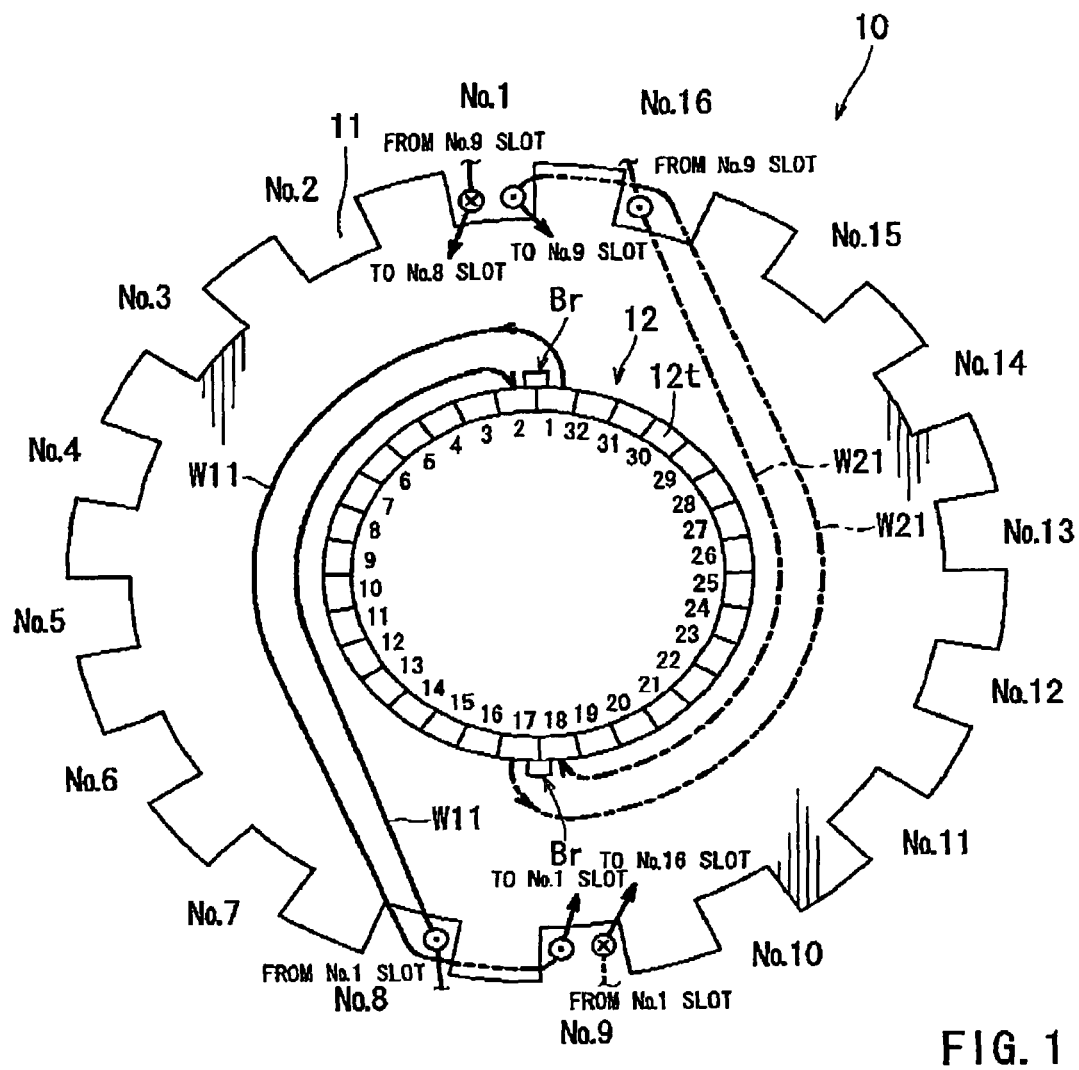
FIG. 1 is a schematic view illustrating paths of wires that are wound around an armature core of an electric motor according to a first embodiment of the present invention.
Figure 2:
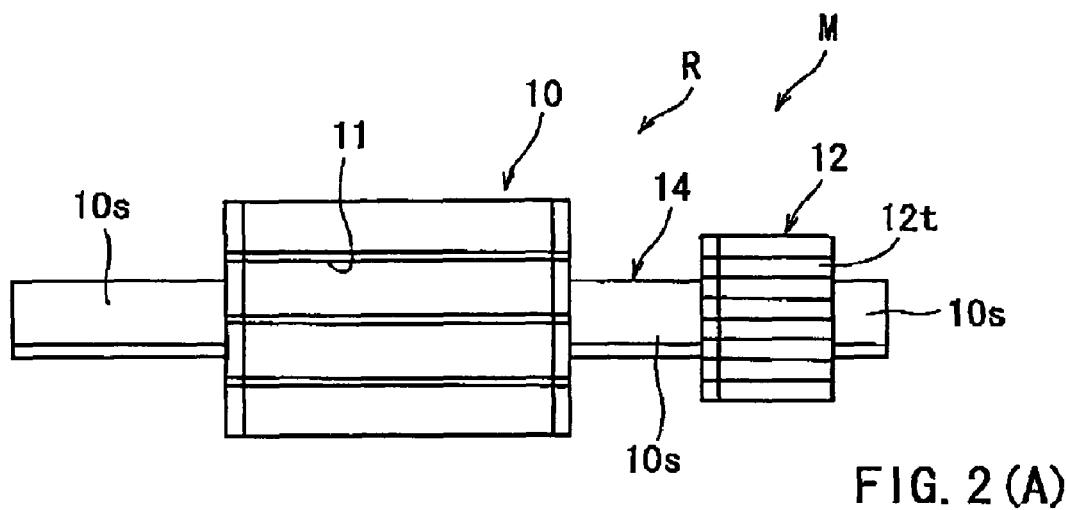
FIG. 2(A) is a schematic view of the motor before the wires are wound.
FIG. 2(B) is a schematic view of the motor after the wires have been wound.
Figure 2:
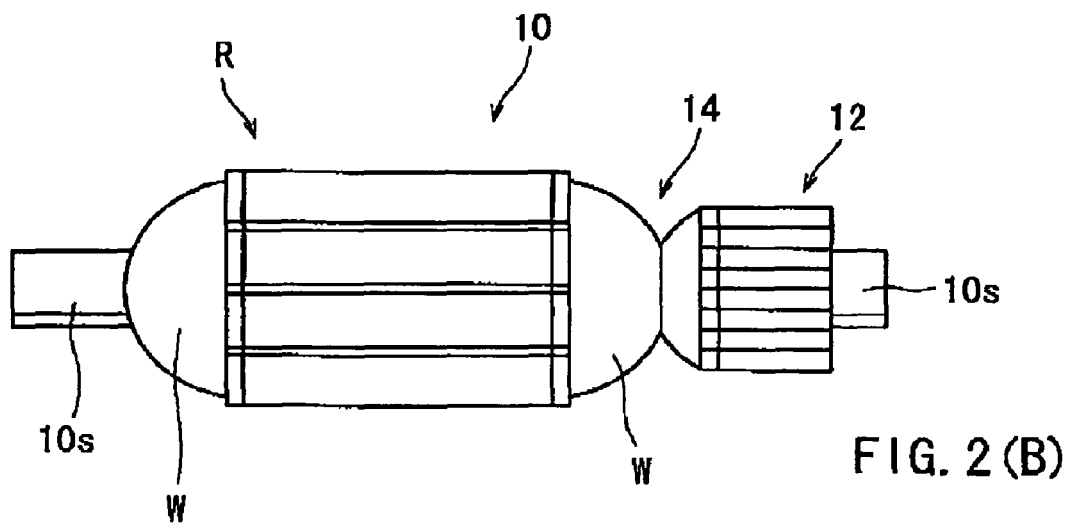

Each of the additional features and teachings disclosed above and below may be utilized separately or in conjunction with other features and teachings to provide improved electric motors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, electric motors include an armature core, a commutator, a neck and a plurality of wires. The armature core has an axis and defines a plurality of armature slots arranged in a circumferential direction of the armature core. The commutator includes a plurality of commutator segments arranged in the circumferential direction of the commutator. The commutator has the same axis as the armature core and is spaced from the armature core in an axial direction. The neck is disposed between the armature core and the commutator and has a diameter smaller than the commutator. Each wire extends along a path in which each wire (a) extends from a first one of the commutator segments to the outer circumference of the neck and extends around a part thereof, (b) extends through a first one of the armature slots of the armature core, turns from the first one of the armature slots to extend through a second one of the armature slots next to the first one of the armature slots, and extends through a third one of the armature slots positioned opposite to the second one of the armature slots with respect to the axis of the armature core, (c) extends around the armature core through the third one and the first one of the armature slots and leaves the first one of the armature slots; or (c') extends around the armature core through the third one and the second one of the armature slots and leaves the third one of the armature slots; and (d) extends around a part of the outer circumference of the neck and extends from the neck to a second one of the commutator segments next to the first one of the commutator segments. The first one and the second one of the armature slots are offset from the first one and the second one of the commutator segments, respectively, by an angle of approximately 180° about the axis.

With this arrangement, each wire may be first passed through the first one of the armature slots and may leave from the armature core through the same slot as the first one, or each wire may be first passed through the first one of the armature slots and may leave from the armature core through the second one of the armature slots next to the first one of the armature slots. In addition, because the first one and the second one of the armature slots are offset from the first one and the second one of the commutator segments, respectively, by an angle of approximately 180° about the axis, each of opposite ends of each wire extends around the neck by an angle of approximately 180° or half the circumferential length of the neck.

A wire No. 1 and a wire No. N will now be considered. Here, the wire No. N is connected between two commutator segments, which are positioned opposite to two commutator segments between which the wire No. 1 is connected, and which are offset by an angle of 180° from the two commutator segments between which the wire No 1 is connected. As noted above, each of opposite ends of each wire is wound around the neck by an angle of about 180° or half the circumferential length of the neck. Therefore, the wire No. 1 and the wire No. N do not contact with each other in the region of the neck. Although a maximum electrical potential difference may be caused between the wire No. 1 and the wire No. N, these wires do not contact with each other in the region of the neck. Therefore, it is possible to prevent potential short-circuiting between these wires. In addition, because each of opposite ends of each wire is wound around the neck by an angle of about 180° or half the circumferential length of the neck, it is possible to prevent the opposite ends from floating at the neck.

The wires may include a plurality of pairs of first and second wires, the first and second wires are wound around the armature core through the same two armature slots. The first wire may first extend through one of the two armature slots, and the second wire may be first passed through the other of the two armature slots.

Embodiments of the present invention will now be described with reference to FIGS. 1 to 9. These embodiments relate to an electric motor for use with a power tool, such as a hammer drill.

<General Construction of Rotor of Electric Motor>

As shown in FIG. 2(A), a rotor R of an electric motor M generally includes a shaft 10*s* defining a rotational axis, an armature core 10 having the same axis as the shaft 10*s* and fixedly mounted to the shaft 10*s* at a substantially central position of the shaft 10*s* along its length, and a commutator 12 also having the same axis as the shaft 10*s* and fixedly mounted to the shaft 10*s* at a position proximal to one end of the shaft 10*s*. A neck 14 is defined by apart of the shaft 10*s* positioned between the armature core 10 and the commutator 12.

In this embodiment, the motor M has sixteen armature slots 11 and thirty two commutator segments 12*t*. More specifically, the armature slots 11 (hereinafter called "armature slots No. 1 to 16") are formed in the outer circumferential surface of the armature core 10 and spaced equally from each other in the circumferential direction. The commutator 12 is divided into the thirty two commutator segments 12*t* (hereinafter called "commutator segments No. 1 to No. 32") spaced equally from each other in the circumferential direction.

<Wires Around Armature Core>

A first representative method of winding the wires W around the armature core 10 will now be described with reference to FIGS. 1 and 3 to 6. In this embodiment, all the wires W are wound around the armature core 10 according to the same pattern of path (hereinafter called "first pattern").

First, the method will be described in connection with a first wire W11 having one end connected to the commutator segment No. 1 and having the other end connected to the commutator segment No. 2. As indicated by solid lines in FIG. 1, after having connected to the commutator segment No. 1, the first wire W11 is wound around the left side part of the outer circumference of the neck 14 by about one half of the circumferential length of the neck 14, and thereafter the first wire W11 is passed through the armature slot No. 8 of the armature core 10. The armature slot No. 8 is offset from the armature slot No. 1 by an angle of about 180°.

Figure 3:
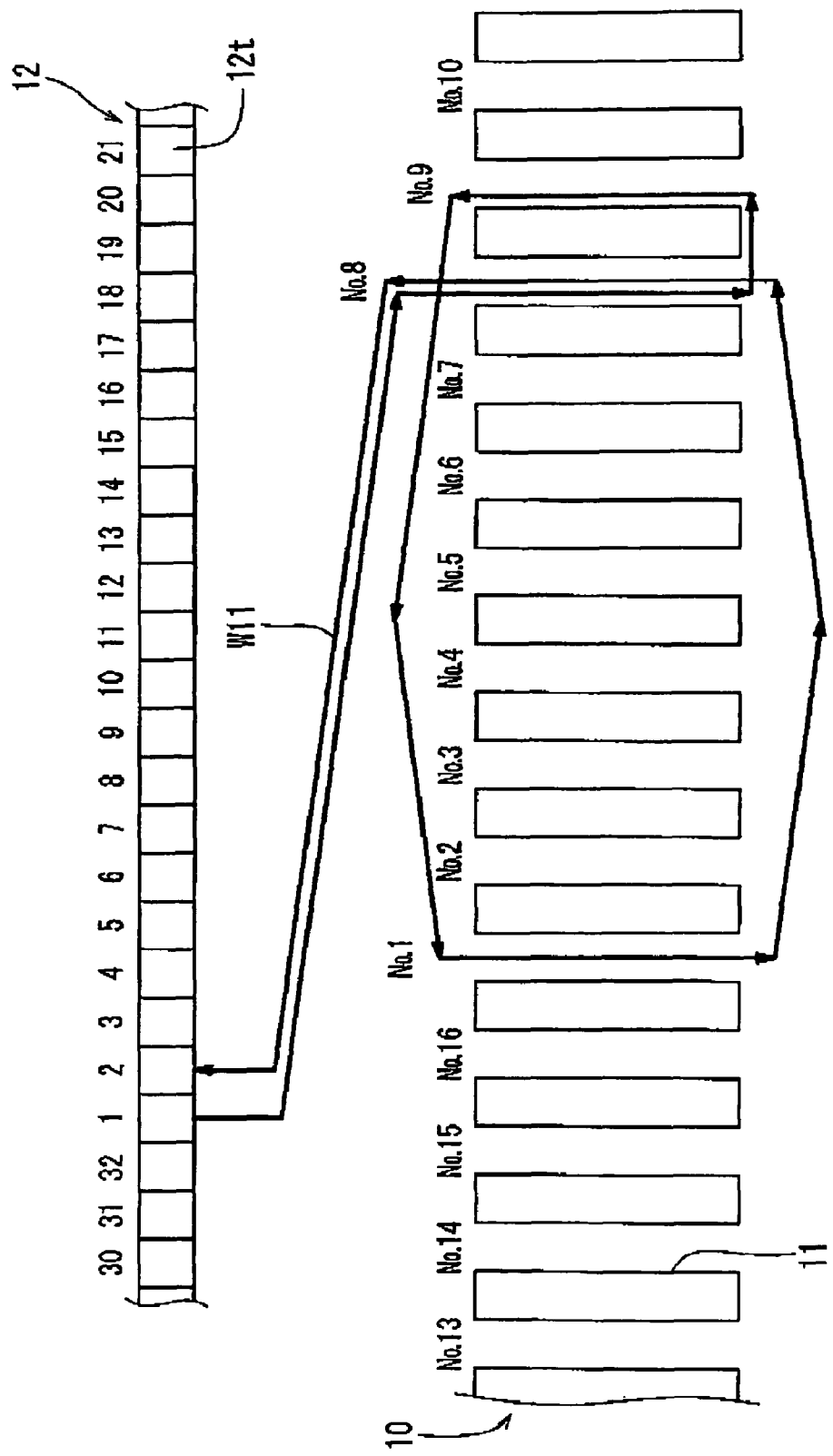
FIGS. 3 to 6 are views illustrating winding paths in developed forms of wires of the motor.
Figure 4:
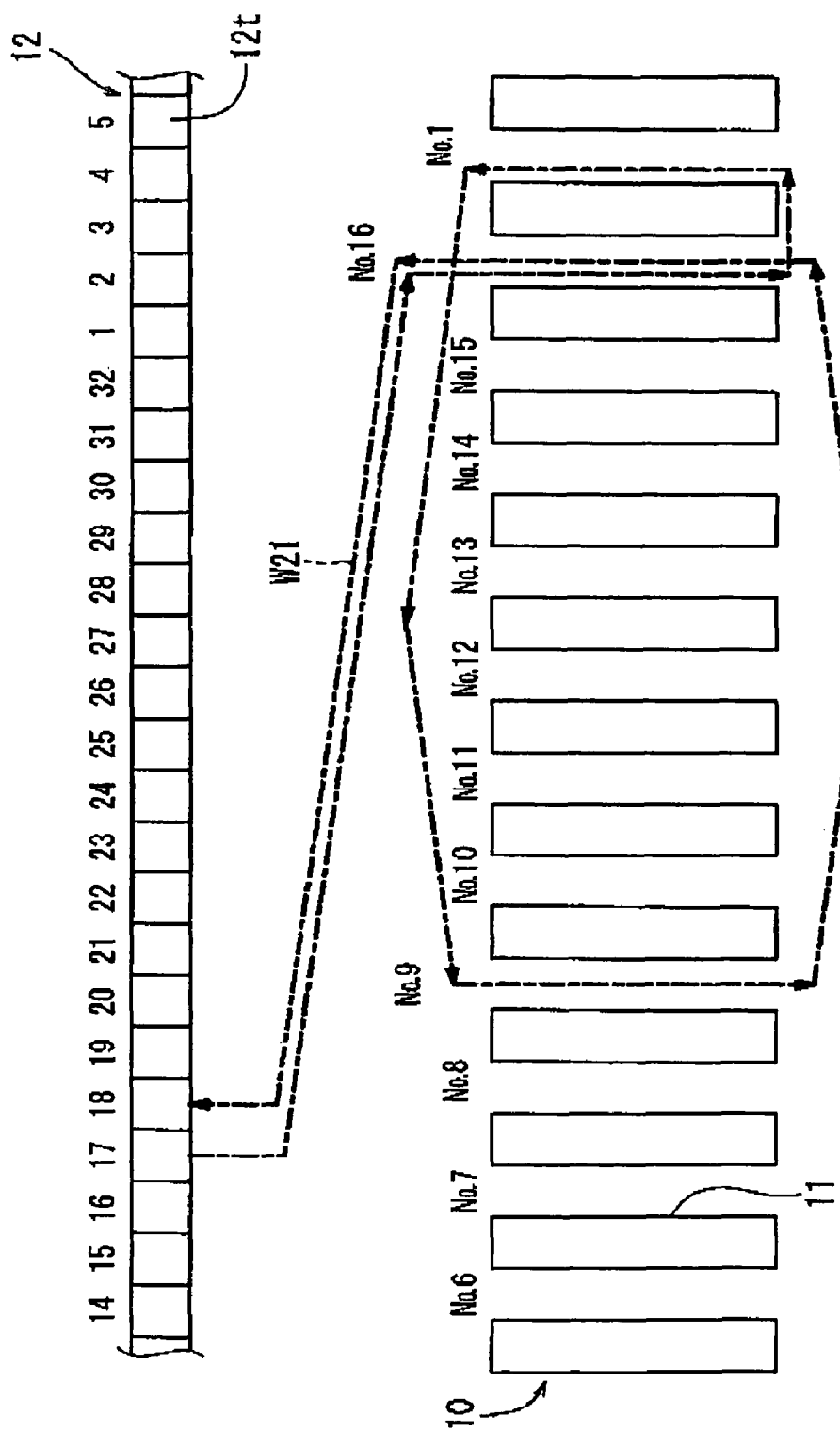

Next, as shown in FIGS. 1 and 3, the first wire W11 is turned from the armature slot No. 8 to be passed through the armature slot No. 9 that is positioned next to the armature slot No. 8. The first wire W11 is then passed through the armature slot No. 1 that is positioned at a position opposite to the armature slot No. 9 with respect to the central axis of the armature core 10. Thereafter, the first wire W11 is wound around the armature core 10 through the armature slot No. 1 and the armature slot No. 8 by a predetermined number of turns (the first wire W11 is wound only one turn in this embodiment). Then, the first wire W11 leaves from the armature slot No. 8 and is wound around the left side part of the outer circumference of the neck 14 by about one half of the circumferential length of the neck 14. Finally, the other end of the first wire W11 is connected to the commutator segment No. 2.

In this way, the first wire W1 extends along the path of "commutator segment No. 1-neck 14-armature slot No. 8-armature slot No. 9-armature slot No. 1-(winding through slot No. 1 and armature slot No. 8)-armature slot No. 8-neck 14-commutator segment No. 2."

Figure 5:
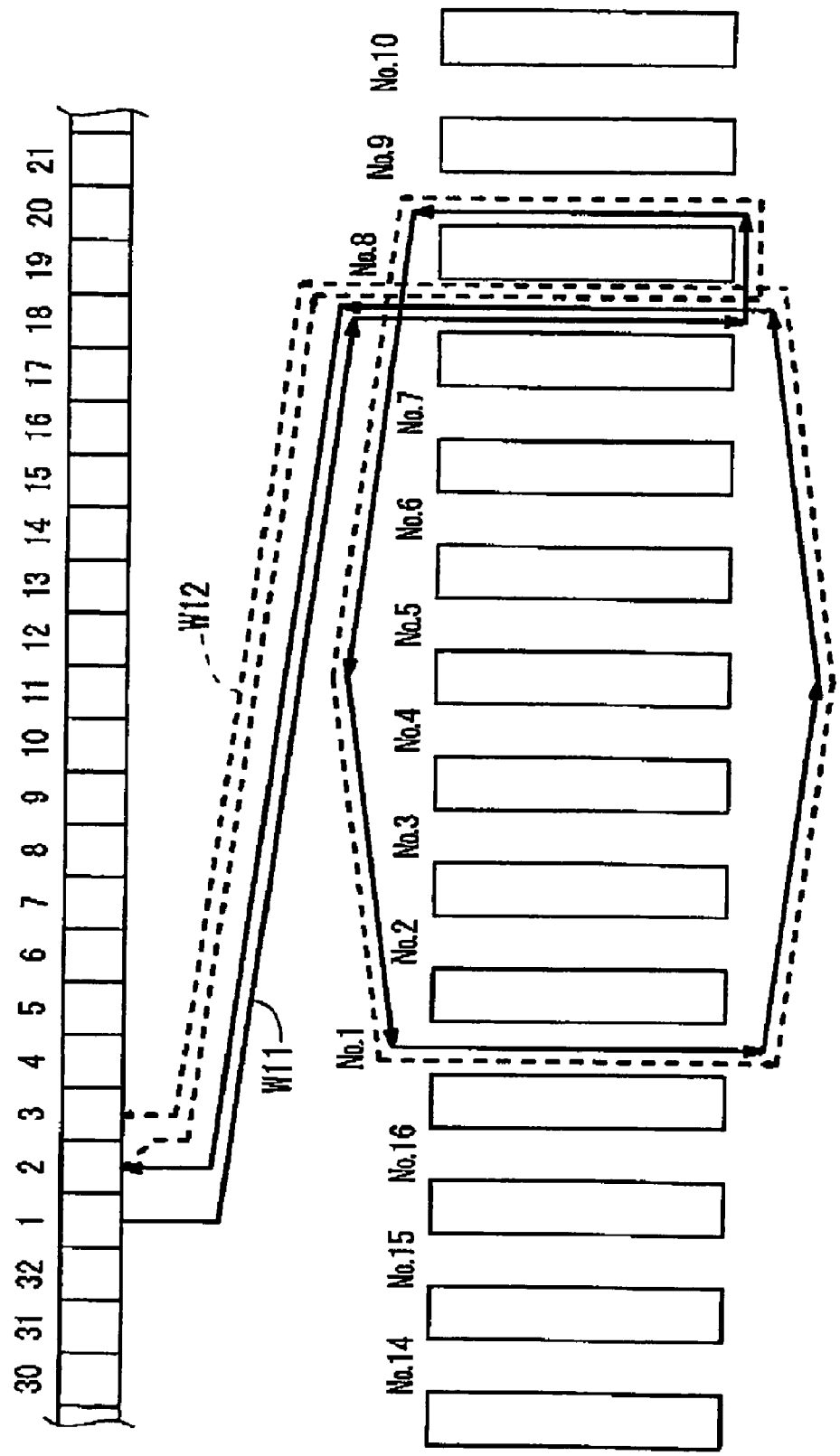

As indicated by dotted lines in FIG. 5, one end of a second wire W12 is connected to the commutator segment No. 2, so that the other end of the first wire W11 is electrically connected to the second wire W12 via the commutator segment No. 2. The second wire W12 is wound around the armature core 10 through the same armature slots and the same order as those for the first wire W1. After leaving from the armature slot No. 8, the other end of the second wire W12 is connected to the commutator segment No. 3.

In this way, the second wire W12 extends along the path of "commutator segment No. 2-neck 14-armature slot No. 8-armature slot No. 9-armature slot No. 1-(winding through slot No. 1 and armature slot No. 8)-armature slot No. 8-neck 14-commutator segment No. 3."

Figure 6:
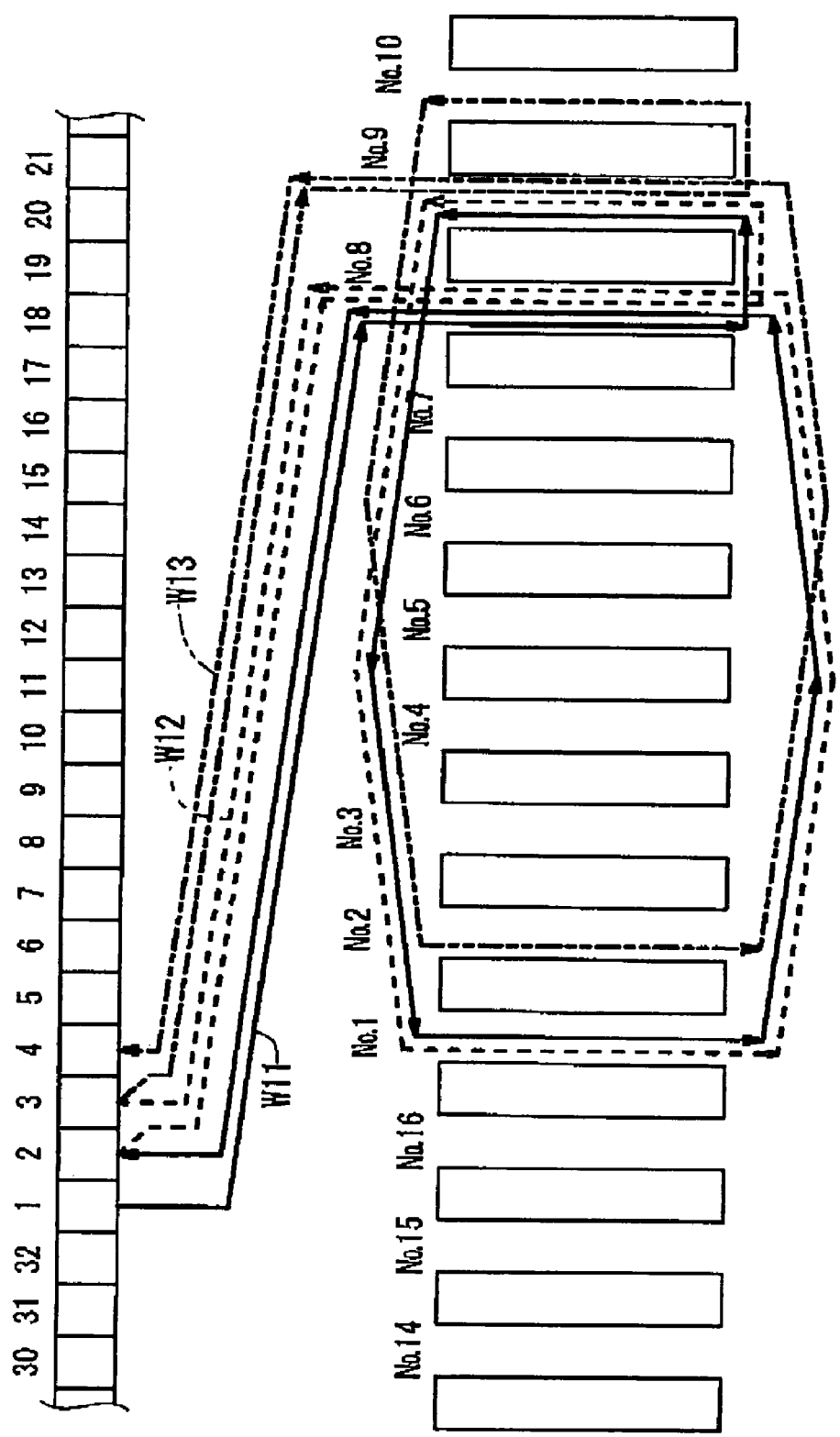

As indicated by chain lines in FIG. 6, one end of a third wire W13 is connected to the commutator segment No. 3, so that the other end of the second wire W12 is electrically connected to the third wire W13 via the commutator segment No. 3. The third wire W13 is wound around the armature core 10 through the armature slots that are positioned next to the armature slots through which the second wire W12 is wound around.

More specifically, after having connected to the commutator segment No, 3, the third wire W13 is wound around the left side part of the outer circumference of the neck 14 by about one half of the circumferential length of the neck 14, and thereafter the third wire W13 is passed through the armature slot No 9 of the armature core 10. Next, the third wire W13 is turned from the armature slot No. 9 to be passed through the armature slot No. 10 that is positioned next to the armature slot No. 9. The third wire W13 is then passed through the armature slot No. 2 that is positioned at a position opposite to the armature slot No. 10 with respect to the central axis of the armature core 10. Thereafter, the third wire W13 is wound around the armature core 10 through the armature slot No. 2 and the armature slot No. 9 by a predetermined number of turns. Then, the third wire W13 leaves from the armature slot No. 9 and is wound around the left side part of the outer circumference of the neck 14 by about one half of the circumferential length of the neck 14. Finally, the other end of the third wire W13 is connected to the commutator segment No. 4.

In this way, the third wire W13 extends along the path of "commutator segment No. 3-neck 14-armature slot No. 9-armature slot No. 10-armature slot No. 2-(winding through slot No. 2 and armature slot No. 9)-armature slot No. 9-neck 14-commutator segment No. 4."

One end of a fourth wire (not shown) is connected to the commutator segment No. 4, so that the other end of the third wire W13 is electrically connected to the fourth wire via the commutator segment No. 4. The fourth wire is wound around the armature core 10 through the same armature slots and the same order as those for the third wire W13.

In this way, according to this method, two wires are wound around the armature core 10 through the same armature slots, and next two wires are wound around the armature core 10 through the armature slots that are respectively positioned next to the armature slots for the previous two wires. In the same manner, the remaining wires are wound around the armature core 10 such that any two wires are wound around the armature core 10 through the armature slots that are respectively positioned next to the armature slots for the previous two wires.

As for the seventeenth wire W21 that have one end connected to the commutator segment No. 17 and the other end connected to the commutator segment No. 18, because the commutator segments Nos. 17 and 18 are offset from the commutator segment Nos. 1 and 2 by an angle of about 180°, respectively, the following winding process is applied.

As indicated by chain lines in FIG. 1, after having connected to the commutator segment No. 17, the seventeenth wire W21 is wound around the right side part of the outer circumference of the neck 14 by about one half of the circumferential length of the neck 14, and thereafter the seventeenth wire W21 is passed through the armature slot No. 16 of the armature core 10. Next, as shown FIGS. 1 and 4, the seventeenth W21 is turned from the armature slot No. 16 to be passed through the armature slot No. 1 that is positioned next to the armature slot No. 16. The seventeenth wire W21 is then passed through the armature slot No. 9 that is positioned at a position opposite to the armature slot No. 1 with respect to the central axis of the armature core 10. Thereafter, the seventeenth wire W21 is wound around the armature core 10 through the armature slot No. 16 and the armature slot No. 9. Then, the seventeenth wire W21 leaves from the armature slot No. 16 and is wound around the right side part of the outer circumference of the neck 34 by about one half of the circumferential length of the neck 14. Finally, the other end of the seventeenth wire W21 is connected to the commutator segment No. 18.

In this way, the seventeenth wire W21 extends along the path of "commutator segment No. 17-neck 14-armature slot No. 6-armature slot No. 1-armature slot No. 9-(winding through slot No. 16 and armature slot No. 9)-armature slot No. 16-neck 14-commutator segment No. 18."

<Advantages of Electric Motor M>

As described above, the armature slot (No. 8) through which the first wire W11 is passed for the first time is the same as the armature slot (No. 8) from which the other end of the first wire W11 leaves. In addition, the armature slot No. 8 is positioned at a position offset by an angle of about 180° from the commutator segments Nos. 1 and 2. Therefore, each of opposite end portions of the first wire W1 is wound around the neck 14 by about one half of the circumferential length of the neck 14. Therefore, as will be seen from FIG. 1, the first wire W11 connected between the commutator segments Nos. 1 and 2 and the seventeenth wire W21 connected between the commutator segments Nos. 17 and 18 do not contact with each other in the region of the neck 14.

The first wire W11 and the seventeenth wire W21 are connected to their respective commutator segments, which are positioned opposite to each other, and therefore, a maximum electrical potential difference may be caused between the first wire W11 and the seventeenth wire W21. However, because the first wire W11 and the seventeenth wire W21 do not contact each other in the region of the neck 14 (an area vulnerable to be influenced by vibrations), and therefore, it is possible to prevent or minimize potential short-circuiting between the wires W11 and W12.

Further, each of opposite end portions of each wire W is wound around the neck 14 by about one half of the circumferential length of the neck 14. Therefore, the opposite end portions of the wires W may not float up in the region of the neck 14.

Although the first wire W11 and the seventeenth wire W21 may partly overlap with each other within the armature slot No. 1 and the armature slot No. 9, the wires W11 and W21 are stably fixed within these armature slots. Hence, the wires W11 and W21 within these armature slots may not be influenced by potential vibrations. As a result, any problems caused due to partial overlapping of the wires W11 and W21, between which a maximum electrical potential difference, may be reduced or eliminated in this configuration.

<Another Path of Wires>

Figure 7:
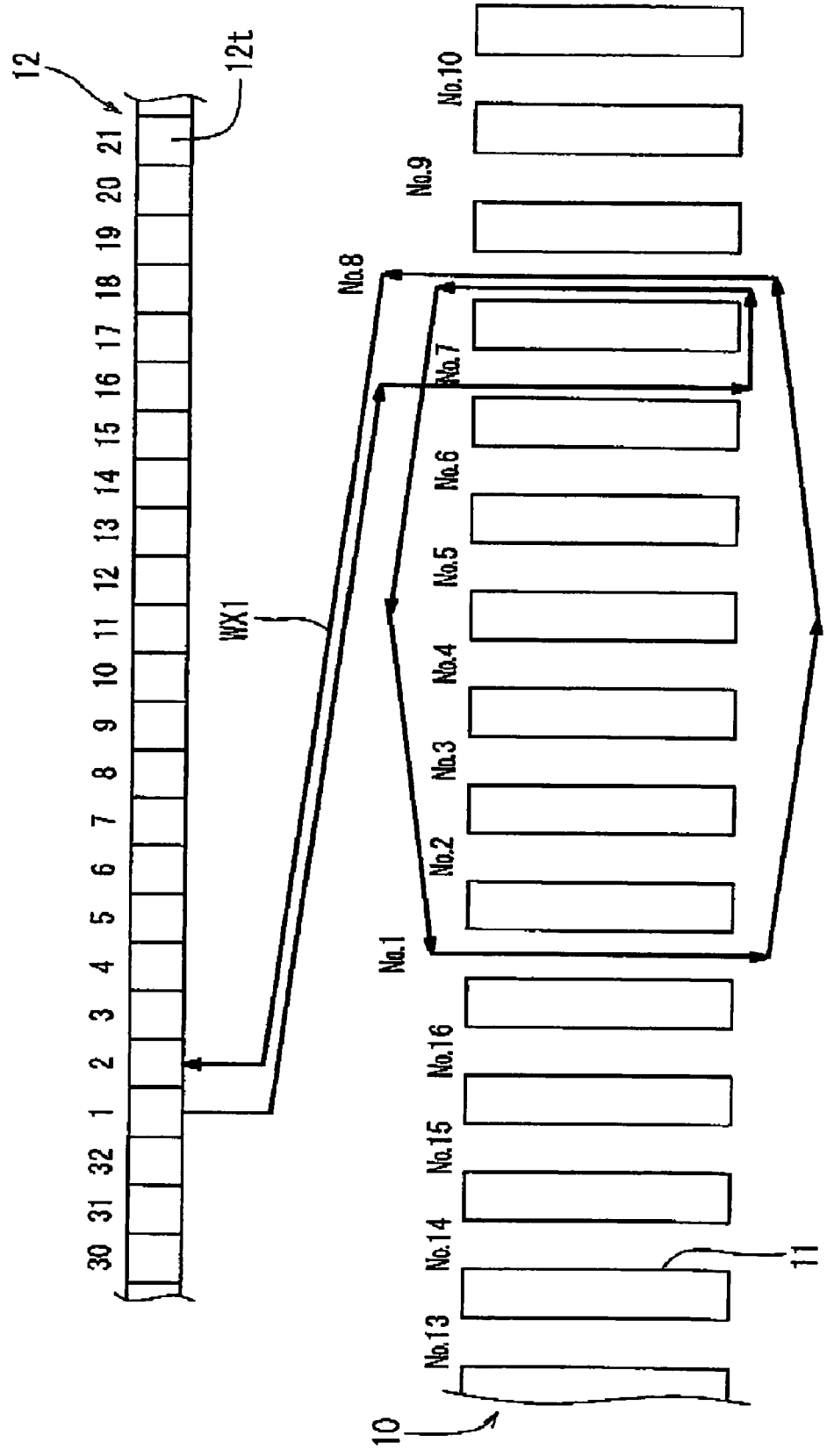
FIGS. 7 to 9 are views illustrating winding paths in developed forms of wires of a motor according to a second embodiment of the present invention.

An alternative method of winding the wires W will now be described with reference to FIGS. 7 to 9. Also with this method, two wires are wound around the armature core 10 through the same armature slots. However, the two wires are first passed through different armature slots from each other.

First, the method will be described in connection with a first wire WX1 having one end connected to the commutator segment No. 1 and having the other end connected to the commutator segment No. 2. As indicated by solid lines in FIG. 7, after having connected to the commutator segment No. 1, the first wire WX1 is wound around the left side part of the outer circumference of the neck 14 by about one half of the circumferential length of the neck 14. Thereafter, the first wire WX1 is passed through the armature slot No. 7 of the armature core 10 and is then turned to pass through the armature slot No. 8 positioned next to the armature slot No. 7. Then, the first wire WX1 is turned from the armature slot No. 8 to be passed through the armature slot No. 1 that is positioned at a position opposite to the armature slot No. 8 with respect to the central axis of the armature core 10. Thereafter, the first wire WX1 is wound around the armature core 10 through the armature slot No. 1 and the armature slot No. 8 by a predetermined number of turns. Then, the first wire W11 leaves from the armature slot No. 8 and is wound around the left side part of the outer circumference of the neck 14 by about one half of the circumferential length of the neck 14. Finally, the other end of the first wire WX1 is connected to the commutator segment No. 2.

In this way, the first wire WX1 extends along the path of "commutator segment No. 1-neck 14-armature slot No. 7-armature slot No. 8-armature slot No. 1-(winding through slot No. 1 and armature slot No. 8)-armature slot No. 8-neck 14-commutator segment No. 2."

Thus, according to this method, the first wire WX1 is first passed through the armature slot No. 7 that is different from the armature slot No. 8, from which the other end of the first wire WX1 leaves. This pattern of path is hereinafter called "second pattern."

Figure 8:
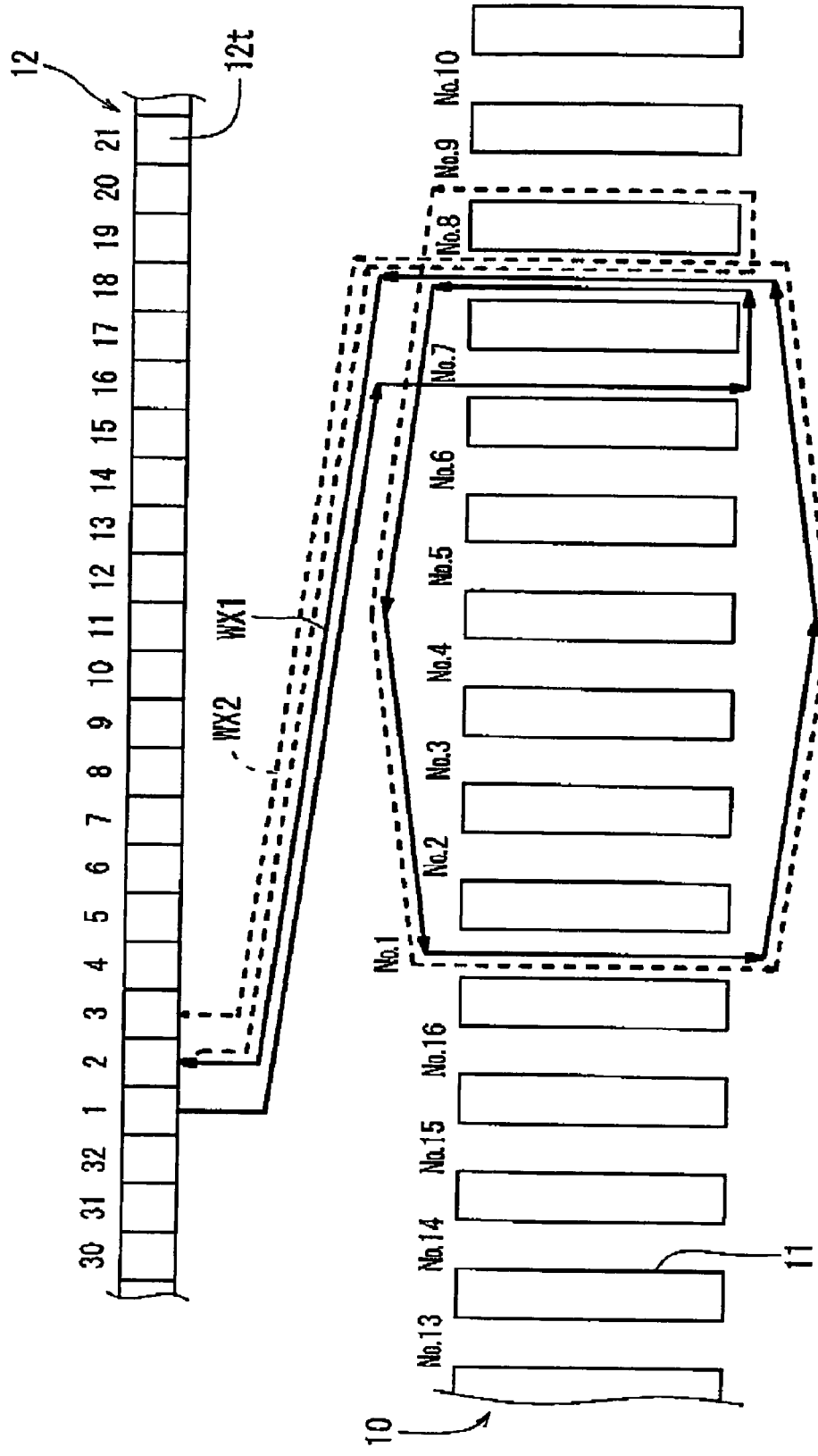

As indicated by dotted lines in FIG. 8, one end of a second wire WX2 is connected to the commutator segment No. 2. The second wire WX2 is then wound around the left side part of the outer circumference of the neck 14 by about one half of the circumferential length of the neck 14, and thereafter the second wire WX2 is passed through the armature slot No. 8 of the armature core 10. Next, the second wire WX2 is turned from the armature slot No. 8 to be passed through the armature slot No. 9 that is positioned next to the armature slot No. 8. The second wire WX2 is then passed through the armature slot No. 1 that is positioned at a position opposite to the armature slot No. 9 with respect to the central axis of the armature core 10. Thereafter, the second WX2 is wound around the armature core 10 through the armature slot No. 1 and the armature slot No. 8 by a predetermined number of turns. Then, the second wire WX2 leaves from the armature slot No. 8 and is wound around the left side part of the outer circumference of the neck 14 by about one half of the circumferential length of the neck 14. Finally, the other end of the second wire WX2 is connected to the commutator segment No. 3.

In this way, the second wire WX2 extends along the path of "commutator segment No. 2-neck 14-armature slot No. 8-armature slot No. 9-armature slot No. 1-(winding through slot No. 1 and armature slot No. 8)-armature slot No. 8-neck 14-commutator segment No. 3."

Thus, the second wire WX2 is wound around the armature core according to the first pattern shown in FIGS. 3 to 6, and therefore, the second wire WX2 is first passed through the same armature slot No. 8, from which the other end of the second wire WX2 leaves.

Therefore, although both the first and second wires WX1 and WX2 are wound around the armature core 10 through the armature slot No. 1 and the armature slot No. 8, the second wire WX1 is first passed through the armature slot No. 8 that is different from the armature slot No. 7 through which the first wire WX1 is first passed.

Figure 9:
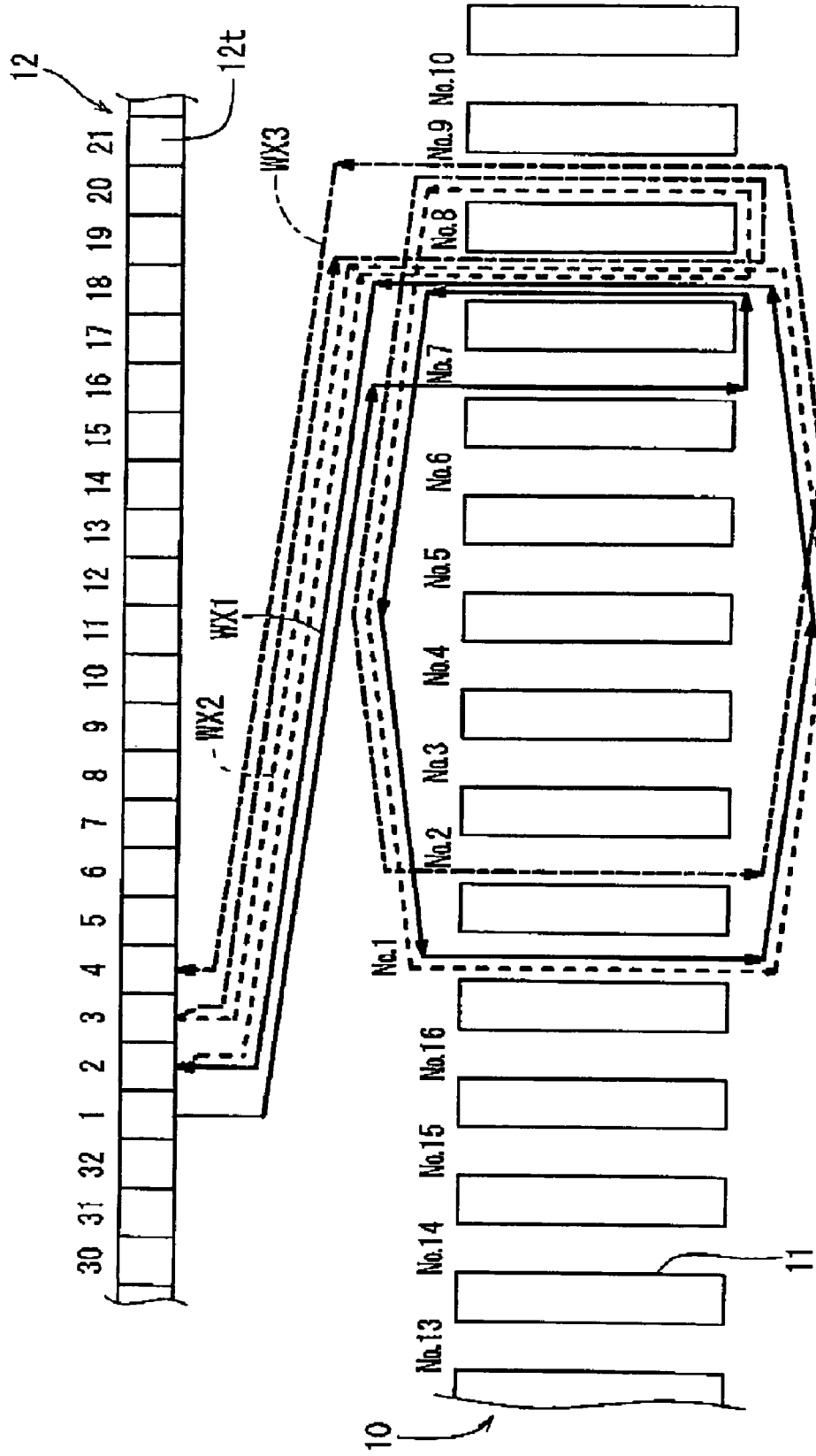
Figure 10:
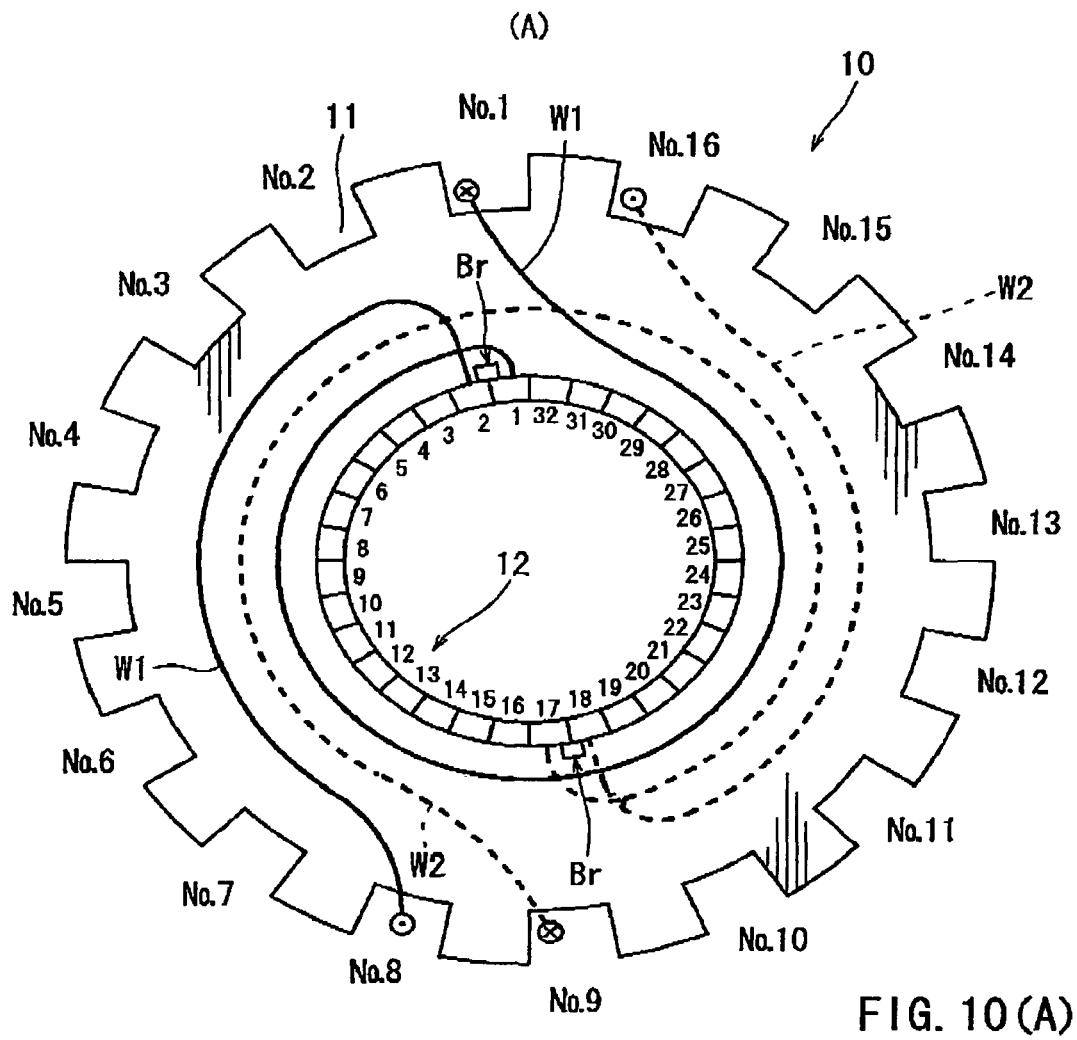
FIG. 10(A) is a schematic view illustrating paths of wires that are wound around an armature core of a known electric motor.
FIG. 10(B) is a schematic view showing a known wiring diagram of the motor.
Figure 10:
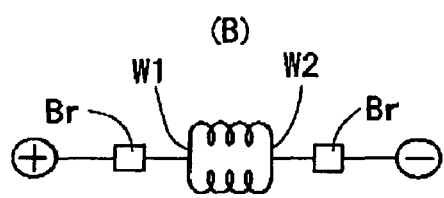

As indicated by chain lines in FIG. 9, a third wire WX3 is wound around the armature core 10 in the second pattern through the armature slots that are positioned next to the armature slots through which the first wire WX1 is wound around.

More specifically, after having connected to the commutator segment No. 3, the third wire WX3 is wound around the left side part of the outer circumference of the neck 14 by about one half of the circumferential length of the neck 14. Thereafter, the third wire WX3 is passed through the armature slot No. 8 of the armature core 10 and is then turned to pass through the armature slot No. 9 positioned next to the armature slot No. 8. Then, the third wire WX3 is turned from the armature slot No. 9 to be passed through the armature slot No. 2 that is positioned at a position opposite to the armature slot No. 9 with respect to the central axis of the armature core 10. Thereafter, the third wire WX3 is wound around the armature core 10 through the armature slot No. 2 and the armature slot No. 9 by a predetermined number of turns. Then, the third wire WX3 leaves from the armature slot No. 9 and is wound around the left side part of the outer circumference of the neck 14 by about one half of the circumferential length of the neck 14. Finally, the other end of the third wire WX3 is connected to the commutator segment No. 4.

In this way, the third wire WX3 extends along the path of "commutator segment No. 3-neck 14-armature slot No. 8-armature slot No. 9-armature slot No. 2-(winding through slot No. 2 and armature slot No. 9)-armature slot No. 9-neck 14-commutator segment No. 4."

A fourth wire (not shown) is wound in the first pattern around the armature core 10 through the armature slots that are positioned next to the armature slots through which the second wire WX2 is wound around. Thus, the fourth wire is wound around the armature core 10 though the armature slot No. 2 and the armature slot No 9 that are the same as those for the third wire WX3. However, the fourth wire is first passed through a different armature slot from the armature slot through which the third wire WX3 is first passed.

In this way, also in this embodiment, two wires are wound around the armature core 10 through the same armature slots, and next two wires are wound around the armature core 10 through the armature slots that are respectively positioned next to the armature slots for the previous two wires. In the same manner, the remaining wires are wound around the armature core 10 such that any two wires are wound around the armature core 10 through the armature slots that are respectively positioned next to the armature slots for the previous two wires.

<Further Alternative Embodiments>

The present invention may not be limited to the above embodiments but may be modified in various ways. Although, the wires W are wound only in the first pattern as shown in FIGS. 3 to 6 according to the first method, and the wires W are wound alternatively in the second pattern and the first pattern in this order as shown in FIGS. 7 to 9 according to the second method, the wires may be wound only in the second pattern or alternatively in the first pattern and the second pattern in this order.

Further, although the above embodiment has been described in connection with the motor M having sixteen armature slots and thirty two commutator segments, it is possible to apply the present invention to any other motors having different number of armature slots and different number of commutator segments.

Furthermore, the number of turns of winding the wires W around the armature core 10 may be suitable determined.

This invention claims:

1. An electric motor comprising:
    an armature core having an axis and defining a plurality of armature slots arranged in a circumferential direction of the armature core;
    a commutator having the same axis as the armature core and spaced from the armature core in an axial direction, wherein the commutator includes a plurality of commutator segments arranged in a circumferential direction of the commutator;
    a neck disposed between the armature core and the commutator and having a diameter smaller than the commutator, and
    a plurality of wires extending around the armature core through the armature slots of the armature core; wherein each wire extends along a path in which each wire
    (a) extends from a first one of the commutator segments to the outer circumference of the neck and extends around a part thereof,
    (b) extends through a first one of the armature slots of the armature core, turns from the first one of the armature slots to extend through a second one of the armature slots next to the first one of the armature slots, and extends through a third one of the armature slots positioned opposite to the second one of the armature slots with respect to the axis of the armature core,
    (c) extends around the armature core through the third one and the first one of the armature slots and leaves the first one of the armature slots; and
    (d) extends around a part of the outer circumference of the neck and extends from the neck to a second one of the commutator segments next to the first one of the commutator segments; and
    wherein the first one and the second one of the armature slots are offset from the first one and the second one of the commutator segments, respectively, by an angle of approximately 180° about the axis.

2. The electric motor as in claim 1, wherein the wires comprise a plurality of pairs of first and second wires, and the first and second wires in each pair extend around the armature core through the same two armature slots.

3. The electric motor as in claim 2, wherein the first wire and the second wire in each pair first extend through one of the two armature slots and the other of the two armature slots, respectively.

4. An electric motor comprising:
    an armature core having an axis and defining a plurality of armature slots arranged in a circumferential direction of the armature core;
    a commutator having the same axis as the armature core and spaced from the armature core in an axial direction, wherein the commutator includes a plurality of commutator segments arranged in a circumferential direction of the commutator,
    a neck disposed between the armature core and the commutator and having a diameter smaller than the commutator; and
    a plurality of wires extending around the armature core through the armature slots of the armature core; wherein each wire extends along a path in which each wire
    (a) extends from a first one of the commutator segments to the outer circumference of the neck and extends around a part thereof,
    (b) extends through a first one of the armature slots of the armature core, turns from the first one of the armature slots to extend through a second one of the armature slots next to the first one of the armature slots, and extends through a third one of the armature slots positioned opposite to the second one of the armature slots with respect to the axis of the armature core,
    (c) extends around the armature core through the third one and the second one of the armature slots and leaves the third one of the armature slots; and
    (d) extends around a part of the outer circumference of the neck and extends from the neck to a second one of the commutator segments next to the first one of the commutator segments; and
    wherein the first one and the second one of the armature slots are offset from the first one and the second one of the commutator segments, respectively, by an angle of approximately 180° about the axis.

5. The electric motor as in claim 4, wherein the wires comprise a plurality of pairs of first and second wires, and the first and second wires in each pair extend around the armature core through the same two armature slots.

6. The electric motor as in claim 5, wherein the first wire and the second wire in each pair first extend through one of the two armature slots and the other of the two armature slots, respectively.

7. An electric motor comprising:
    an armature core having an axis and defining a plurality of armature slots arranged in a circumferential direction of the armature;
    a commutator having the same axis as the armature core and spaced from the armature core in an axial direction, wherein the commutator comprises a plurality of commutator segments arranged in a circumferential direction of the commutator;
    a neck disposed between the armature core and the commutator; and
    a plurality of wires each connected between two adjacent commutator segments and wound around the armature core via the neck; wherein
    the wires include a first wire connected between first two adjacent commutator segments and a second wire connected between second two adjacent commutator segments positioned opposite to the first two adjacent commutator segments with respect to the axis;
    the first wire and the second wire extends along the neck not to contact with each other.

8. The electric motor as in claim 7, wherein each of the first and second wires extends along the neck while being wound around the neck by a substantially half the circumferential length of the neck.

9. The electric motor as in claim 7, wherein all the wires extend between two adjacent commutator segments via the armature core in the same pattern.

10. The electric motor as in claim 7, wherein:
the wires include first pattern wires and second pattern wires;
the first pattern wires extend between two adjacent commutator segments via the armature core in a first pattern;
the second pattern wires extend between two adjacent commutator segments via the armature core in a second pattern; and
the first pattern wires and the second pattern wires are positioned alternatively in the circumferential direction.

* * * * *